(12) United States Patent
Hojo et al.

(10) Patent No.: US 8,557,456 B2
(45) Date of Patent: Oct. 15, 2013

(54) FUEL CELL SYSTEM

(75) Inventors: Nobuhiko Hojo, Neyagawa (JP); Yuu Inatomi, Moriguchi (JP); Yukihiro Okada, Katano (JP)

(73) Assignee: Panasonic Corporation, Osaka (JP)

( * ) Notice: Subject to any disclaimer, the term of this patent is extended or adjusted under 35 U.S.C. 154(b) by 1358 days.

(21) Appl. No.: 10/545,119

(22) PCT Filed: Feb. 6, 2004

(86) PCT No.: PCT/JP2004/001306
§ 371 (c)(1),
(2), (4) Date: Mar. 3, 2006

(87) PCT Pub. No.: WO2004/070865
PCT Pub. Date: Aug. 19, 2004

(65) Prior Publication Data
US 2006/0199047 A1 Sep. 7, 2006

(30) Foreign Application Priority Data
Feb. 10, 2003 (JP) .................... 2003-032739

(51) Int. Cl.
*H01M 8/06* (2006.01)
(52) U.S. Cl.
USPC .......................................... 429/421; 429/408
(58) Field of Classification Search
USPC .................... 429/13, 408, 415, 421
See application file for complete search history.

(56) References Cited

U.S. PATENT DOCUMENTS

| 2002/0034668 A1* | 3/2002 | Zhang et al. ............ 429/25 |
| 2002/0182459 A1* | 12/2002 | Hockaday et al. ........ 429/19 |
| 2003/0091876 A1* | 5/2003 | Rusta-Sellehy et al. ..... 429/17 |
| 2003/0099876 A1* | 5/2003 | Finkelshtain et al. ....... 429/46 |

(Continued)

FOREIGN PATENT DOCUMENTS

| JP | 56-59477 | 5/1981 |
| JP | 02-027668 | 1/1990 |

(Continued)

OTHER PUBLICATIONS

Hayato Tanaka et al., "Preparation of Electrode Catalyst for 2-Propanol/Acetone-Based Thermo-Regenerative Fuel Cell," Bulletin of the Chemical Society of Japan, the 79th Spring Meeting, Mar. 28, 2001, pp. 131-136 (with English Translation of Fig. 2 on p. 132).

(Continued)

*Primary Examiner* — Milton I Cano
*Assistant Examiner* — Stephen Yanchuk
(74) *Attorney, Agent, or Firm* — McDermott Will & Emery LLP

(57) ABSTRACT

The fuel cell system of the present invention has: a fuel cell including an electromotive unit comprising a fuel electrode, an oxidant electrode, and an electrolyte sandwiched by these electrodes; a fuel supply unit for supplying a fuel to the fuel electrode; and an oxidant supply unit for supplying an oxidant to the oxidant electrode. A product reduction mechanism unit is provided to reduce a fuel oxidation product produced at the fuel electrode when power is generated by the fuel cell. Based on this, decline in energy density due to the fuel and the fuel oxidation product and by-product can be prevented, without having a mechanism to discharge the fuel and the fuel oxidation product and by-product to the outside of the fuel cell.

9 Claims, 6 Drawing Sheets

(56) References Cited

U.S. PATENT DOCUMENTS

| | | | |
|---|---|---|---|
| 2003/0121543 A1* | 7/2003 | Gratzel et al. | 136/252 |
| 2003/0124408 A1* | 7/2003 | Hojo et al. | 429/34 |
| 2004/0009379 A1* | 1/2004 | Amendola et al. | 429/17 |
| 2004/0126631 A1* | 7/2004 | Uchida et al. | 429/13 |
| 2004/0131919 A1* | 7/2004 | Yasumoto et al. | 429/42 |
| 2004/0224193 A1* | 11/2004 | Mitlitsky et al. | 429/13 |

FOREIGN PATENT DOCUMENTS

| | | | |
|---|---|---|---|
| JP | 05-275107 | | 10/1993 |
| JP | 06-260204 | | 9/1994 |
| JP | 07-310107 | | 11/1995 |
| JP | 10-507572 | | 7/1998 |
| JP | 10-330979 | | 12/1998 |
| JP | 2000-268835 | | 9/2000 |
| JP | 2001-102070 | | 4/2001 |
| JP | 2001-198469 | | 7/2001 |
| JP | 2002-126458 | | 5/2002 |
| JP | 2002-231255 | | 8/2002 |
| JP | 2002-343403 | | 11/2002 |
| JP | 2003-017075 | | 1/2003 |
| JP | 2003-045449 | | 2/2003 |
| JP | 2003-77521 A | | 3/2003 |
| JP | 2003077521 | * | 3/2003 |
| JP | 2003-346862 | | 12/2003 |
| JP | 2004-134132 | | 4/2004 |
| JP | 2004-192834 | | 7/2004 |
| JP | 2004-192879 | | 7/2004 |
| WO | WO 96/12317 | | 4/1996 |

OTHER PUBLICATIONS

Arvia, et al., J. Electroanal. Chem., 350 (1993) p. 97.
Sugii et al., "Summary File of 69th Meeting of Electrochemical Society" Apr. 1, 2002, p. 79.
Matsuoka et al., "Summary File of 69th Meeting of Electrochemical Society" Apr. 1, 2002, p. 80.
R.F. Nystrom et al., J. Am. Chem. Soc., 1198 (1947).
S.W. Chaikin et al., J. Am. Chem. Soc., 122 (1949).
Chemical Engineering, 2003 Vo.. 48 No. 1.
39th National Heat Transfer Symposium of Japan 2002, vol. III.

* cited by examiner

F I G. 1
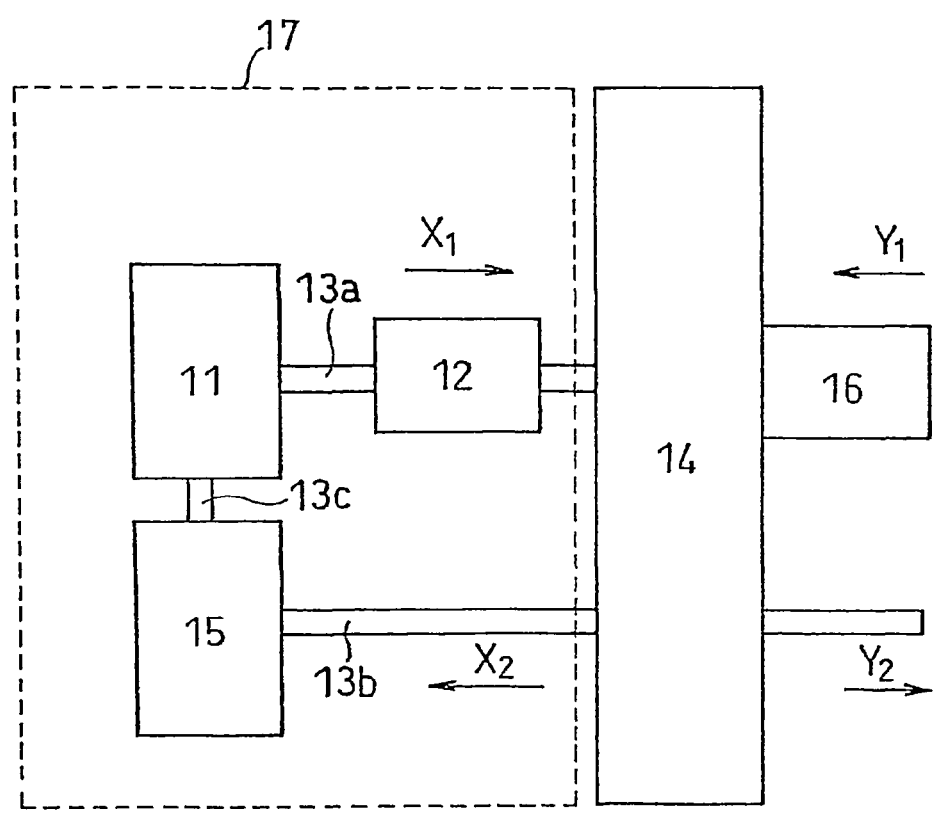

F I G. 3
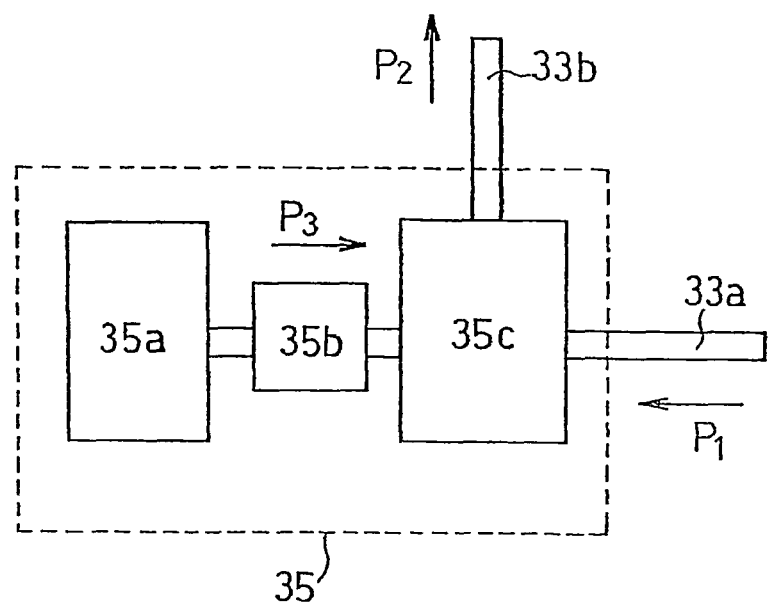

FUEL CELL SYSTEM

RELATED APPLICATION

This application is a U.S. national phase application of PCT international application PCT/JP04/001306 filed on Feb. 6, 2004, which in turn claims the benefit of Japanese Application No. 2003-032739, filed Feb. 10, 2003, the disclosures of which Applications are incorporated by reference herein.

TECHNICAL FIELD

The present invention relates to a fuel cell system (fuel cell power generating apparatus) including a fuel cell directly using an aqueous solution in which an organic material is dissolved as a fuel, and using oxygen or air as an oxidant.

BACKGROUND ART

As a fuel for a fuel cell, hydrogen gas and a liquid and a gaseous fuel of hydrocarbon are used. The fuel cell using a hydrocarbon fuel is classified into a type which reforms the fuel into hydrogen gas by a reformer and generates power with the hydrogen gas as a fuel, and into a type which supplies a hydrocarbon fuel directly into the fuel cell. In the latter fuel cell, the reformer is unnecessary and a whole fuel cell system can be downsized, since the fuel is directly oxidized at a fuel electrode.

The reaction in the fuel cell in which methanol having a high energy density is used, for example, by directly oxidizing the methanol as a hydrocarbon fuel is represented by the formula (1):

Fuel Electrode: $CH_3OH + H_2O \rightarrow CO_2 + 6H^+ + 6e^-$

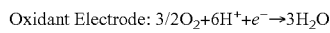
Oxidant Electrode: $3/2 O_2 + 6H^+ + 6e^- \rightarrow 3H_2O$

Whole Cell Reaction: $CH_3OH + 3/2 O_2 \rightarrow CO_2 + 2H_2O$

As is clear from the formula (1), the volume energy density of 4800 Wh/L is very high, since 1 mol of methanol generates 6 mol of electrons. It is also clear that 1 mol of carbon dioxide is generated as a fuel oxidation product at the fuel electrode in this fuel cell. Based on such generation of carbon dioxide by the power generation, an internal pressure of the fuel cell tends to increase gradually, thereby creating a problem of liquid fuel leakage and deterioration in battery performance.

For such problems, in Japanese Laid-Open Patent Publication No. Hei 10-507572 (pages 17 to 24, FIGS. 1 to 2) and Japanese Laid-Open Patent Publication No. 2001-102070 (pages 1 to 5, FIG. 1), there has been proposed a fuel cell system including a carbon dioxide discharge mechanism in which a porous material of fluorocarbon resin is used to separate carbon dioxide and fuel, and only carbon dioxide is selectively discharged to the outside of the fuel cell, for example.

FIG. 6 is a diagram illustrating a fuel cell system including the carbon dioxide discharge mechanism. In FIG. 6, this type of fuel cell system comprises an electromotive unit 54 of fuel cell, a fuel supply unit 57 for supplying a fuel to the electromotive unit, and an oxidant supply unit 56 for supplying an oxidant to the electromotive unit. Additionally, the fuel supply unit 57 includes a fuel container 51, a pump 52, a fuel supply pipe 53, and a carbon dioxide discharge mechanism 55.

The fuel is supplied from the fuel container 51 by the pump 52 via the fuel supply pipe 53 to the electromotive unit 54 in the direction of an arrow $L_1$, and the oxidant is supplied to the electromotive unit 54 by the oxidant supply unit 56 in the direction of an arrow $L_2$ to generate power. The carbon dioxide produced by the power generation flows in the direction of an arrow $L_3$. The carbon dioxide is discharged to the outside of the fuel cell system in the direction of an arrow $L_4$ by the carbon dioxide discharge mechanism 55 including a film which separates gas and liquid such as a fluorine porous film, for example.

However, the film for separating gas and liquid used as the carbon dioxide discharge mechanism can not completely separate carbon dioxide and fuel selectively, and uses the difference in surface tension of liquid and the separation film to separate gas and liquid. Thus, in addition to carbon dioxide, evaporated fuel and an oxidation product other than the carbon dioxide, and an oxidation by-product (aldehyde and the like, for example) which are produced at the time of the oxidation of fuel are discharged to the outside of the fuel cell as well in gaseous state, passing through the separation film. Therefore, there is a problem in that the fuel and by-product in gaseous state leak out of the fuel cell as vapor.

As a means for solving the problem, it is effective to use a fuel which is difficult to completely combust electrochemically, instead of methanol. Alcohol fuels such as ethanol, propanol, and butanol, for example, are hardly oxidized to become carbon dioxide by complete combustion, even though they are oxidized electrochemically.

In this case, based on the fact that generation of carbon dioxide, which involves enormous volume expansion from liquid to gas, will not occur at the fuel electrode with the oxidation reaction of fuel, the fuel electrode of the fuel cell can be completely sealed. Thus, leakages of evaporated fuel, and fuel oxidation product and by-product to the outside of the fuel cell can be suppressed.

On the other hand, when a fuel other than methanol is used, a very safe fuel cell system without discharging fuel, and fuel oxidation product and by-product can be made. However, since the fuel oxidation reaction itself is incomplete, energy density of fuel will become very low. This point is explained briefly by using propanol and ethylene glycol as examples.

The reaction formula (at the time of complete combustion) of a fuel cell in which propanol is used by direct oxidization is represented by the formula (2):

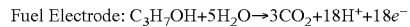
Fuel Electrode: $C_3H_7OH + 5H_2O \rightarrow 3CO_2 + 18H^+ + 18e^-$

Oxidant Electrode: $9/2 O_2 + 18H^+ + 18e^- \rightarrow 9H_2O$

Whole Cell Reaction: $C_3H_7OH + 9/2 O_2 \rightarrow 3CO_2 + 4H_2O$

Also, the reaction formula (at the time of complete combustion) of a fuel cell in which ethylene glycol is used by direct oxidation is represented by formula (3):

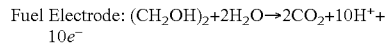
Fuel Electrode: $(CH_2OH)_2 + 2H_2O \rightarrow 2CO_2 + 10H^+ + 10e^-$

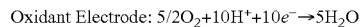
Oxidant Electrode: $5/2 O_2 + 10H^+ + 10e^- \rightarrow 5H_2O$

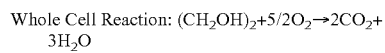
Whole Cell Reaction: $(CH_2OH)_2 + 5/2 O_2 \rightarrow 2CO_2 + 3H_2O$ In both propanol and ethylene glycol cases, product will be carbon dioxide when completely combusted, and volume energy densities are respectively very high, showing 7100 Wh/L and 5800 Wh/L.

However, when these fuels are actually used, the reaction at the fuel electrode becomes an incomplete combustion: it is reported that acetone is produced when propanol is used (A. J. Arvia. et al, J. Electroanal. Chem., 350 (1993)97., and Hiromasa Sugii et al., "Summary File of 69th Meeting of Electrochemical Society" (page 79), Apr. 1, 2002, Electrochemical Society of Japan, for example), and that glycolic acid and formic acid are produced when ethylene glycol is used (Takashi Matsuoka et al., "Summary File of 69th Meeting of Electrochemical Society" (page 80) Apr. 1, 2002, Electrochemical Society of Japan, for example).

In these cases, the products are liquid, and have no generation of gas which involves enormous volume expansion: therefore, the fuel electrode can be sealed. However, due to the incomplete combustion of the fuel oxidation reaction, the energy density of fuel is greatly reduced in comparison with the value noted above. For example, when 2-propanol is used as a fuel, with complete combustion, 1 mol of fuel produces 18 mol of electrons, as shown in the formula (2). However, due to an incomplete combustion actually, the fuels are oxidized only to become acetone, producing 2 mol of electrons from 1 mol of fuel.

Therefore, the energy density in this case is extremely low, being 2/18(=790 Wh/L) of the complete combustion. That is, the fuel cell system without having to discharge the fuel, and the fuel oxidation product and by-product had a problem of very low energy density of fuel.

In light of the above problems of the conventional technology, the present invention aims to provide a fuel cell system which can prevent the reduction of energy density due to the cause described above, when the fuel other than methanol which can suppress leakage of the fuel oxidation product and by-product to the outside of the fuel cell is used.

DISCLOSURE OF INVENTION

The present invention relates to a fuel cell system having a fuel cell including an electromotive unit comprising a fuel electrode, an oxidant electrode, and an electrolyte sandwiched by the fuel electrode and the oxidant electrode; a fuel supply unit for supplying a fuel to the fuel electrode; and an oxidant supply unit for supplying an oxidant to the oxidant electrode, characterized in that the fuel is an organic fuel which produces proton by electrochemical oxidation reaction and which does not produce carbon dioxide, and a product reduction mechanism unit for reducing a fuel oxidation product generated with power generation of the fuel cell at the fuel electrode is included.

It is preferable that the product reduction mechanism unit includes a reductant for chemically reducing the fuel oxidation product.

Also, it is preferable that the product reduction mechanism unit includes a reductant container, a product reducing unit, and a fuel solution supply unit.

Additionally, it is preferable that the fuel cell system includes an attaching/detaching unit for attaching and detaching only the reductant container from the fuel cell system or from the product reduction mechanism unit.

BRIEF DESCRIPTION OF DRAWINGS

FIG. 1 is a sectional view schematically illustrating a fuel cell body of an embodiment of the present invention.

FIG. 3 is a sectional view schematically illustrating a product reduction mechanism unit of an embodiment of the present invention.

BEST MODE FOR CARRYING OUT THE INVENTION

Figure 2:
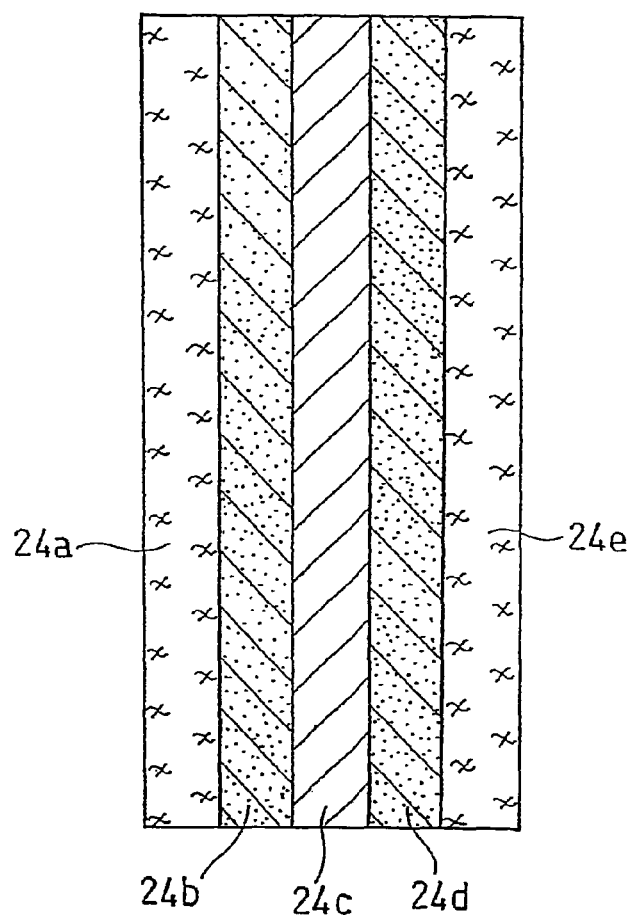
FIG. 2 is a sectional view schematically illustrating an electromotive unit of fuel cell of an embodiment of the present invention.

The fuel cell system of the present invention is characterized by including a product reduction mechanism unit for reducing a fuel oxidation product produced by an oxidation reaction at a fuel electrode of a fuel cell. Embodiments of the present invention are described in detail by referring to the drawings. FIG. 1 is a diagram showing a structure of an embodiment of a fuel cell system of the present invention. The present invention is not to be limited thereto.

The fuel cell system shown in FIG. 1 has a fuel cell 14 including an electromotive unit, a fuel supply unit 17 for supplying a fuel to the electromotive unit, and an oxidant supply unit 16 for supplying air or oxygen as an oxidant to the electromotive unit. The fuel supply unit 17 has a fuel container 11, a fuel supply pipe 13*a* for supplying the fuel from the fuel container 11 to the electromotive unit in the direction of an arrow $X_1$, a pump 12, and a product reduction mechanism unit 15 for reducing a fuel oxidation product produced at the electromotive unit. A discharge pipe 13*b* is connected from the fuel cell 14 to the product reduction mechanism unit 15.

Although the pump 12 for supplying the fuel is shown in FIG. 1, in the present invention, the fuel cell system can be formed even without the pump 12. In that case, the fuel supply pipe 13*a* and the discharge pipe 13*b* may be formed by a thin pipe: thin to an extent which capillarity can function. Alternatively, in order to assist the supply of fuel, a non-woven fabric or a porous material comprising polyurethane, polyester, cellulose, phenol resin, polypropylene, a glass fiber, or the like may be charged inside of the pipe.

The oxidant supply unit 16 for supplying the oxidant may be provided with a mechanism such as a pump or a fan for involuntarily sending air or oxygen, for example. The fuel cell system of the present invention can be also formed even when such mechanism is not provided. In such case, a plurality of openings can be provided at an air electrode side of the electromotive unit of the fuel cell 14, in order for the air to be supplied naturally and easily.

In FIG. 1, a fuel is supplied to the electromotive unit of the fuel cell 14 according to the direction of an arrow $X_1$, and is partly oxidized by an oxidation reaction at the fuel electrode. A mixture of unconsumed fuel and a fuel oxidation product is sent to the product reduction mechanism unit 15 according to the direction of an arrow $X_2$. The product reduction mechanism unit 15 is formed so that at least a part of the fuel oxidation product is reduced to regenerate a fuel, and the regenerated fuel is re-circulated through the fuel supply pipe 13*a* according to the direction of an arrow $X_1$.

The electromotive unit of the fuel cell 14 may be formed by a unit cell having a fuel electrode including a catalyst layer, an oxidant electrode including a catalyst layer, and an electrolyte membrane sandwiched by these electrodes. The electromotive unit may be formed by a stack obtained by stacking a plurality of the unit cells, or may have a structure obtained by connecting a plurality of the unit cells in series or in parallel in a plurality of planes.

An example of a structure of the unit cell is shown in FIG. 2. As shown in FIG. 2, the unit cell comprises a fuel diffusion layer 24a, a fuel electrode catalyst layer 24b, an electrolyte membrane 24c, an oxidant electrode catalyst layer 24d, and an air or an oxidant diffusion layer 24e. The diffusion layer 24a and the fuel electrode catalyst layer 24b form a fuel electrode, and the oxidant electrode catalyst layer 24d and the diffusion layer 24e form an oxidant electrode.

For the fuel which may be used in the fuel cell system of the present invention having the product reduction mechanism unit 15 which can reduce the fuel oxidation product, a fuel can be used as long as the fuel releases protons by an electrochemical oxidation reaction, and the fuel oxidation reaction product can be reduced electrochemically, chemically or optically to regenerate a fuel. Therefore, various organic matters may be used, and an organic fuel having a carbon number of two or more can be preferably used in particular. However, even with a carbon number of one, the fuel may be used as long as the fuel is not oxidized to become carbon dioxide by complete combustion due to an electrochemical oxidation reaction. Among these fuels, alcohols such as ethanol, propanol, butanol, and ethylene glycol; ethers such as diethyl ether; and organic hydrides such as cyclohexane, and decalin, can be preferably used.

In the following, functions of the product reduction mechanism unit 15 are described by using an alcohol as an example among various fuels. The oxidation reaction of an alcohol is represented by the formulae (4) and (5) below.

$$R_1-C(-OH)-R_2 \rightarrow R_1-C(=O)-R_2+2H^++2e^- \quad (4)$$

$$R_3-C-OH \rightarrow R_3-C(=O)-OH+4H^++4e^- \quad (5)$$

in the formulae, each of $R_1$, $R_2$, and $R_3$, is independently an aliphatic group (an alkyl group, for example), an aromatic group, a hydroxyl group, an alkoxy group, an aldehyde group, or a carboxyl group. The aliphatic group or the aromatic group may be a derivative including one or more oxygen atom, nitrogen atom, silicon atom, phosphorus atom, boron atom, or halogen atom.

As is clear from the formulae (4) and (5), when these alcohols are oxidized, ketone and carboxylic acid are produced as oxidation products. This is generally well-known, and reduction reaction of ketone and carboxylic acid to alcohol are also known (R. F. Nystrom. et al, J. Am. Chem. Soc., 1198 (1947)69, and S. W. Chaikin. et al, J. Am. Chem. Soc., 122 (1949)71, for example). As in the reaction shown by the formulae (4) and (5), by the fuel oxidation reaction at the fuel electrode of the electromotive unit of fuel cell 14, alcohol is oxidized to produce a fuel oxidation product such as ketone or carboxylic acid.

Usually, when these fuels are used, generation of gas such as carbon dioxide involving volume expansion will not occur, and the circulating system can be sealed. Thus, there is no need to worry that leakage of fuel and oxidation product to the outside of the fuel cell system will occur. However, due to incomplete combustion, energy density of fuel will be approximately ½ to 1/10 of the energy density at the time of complete combustion, becoming very small value. By providing a product reduction mechanism unit to this fuel cell system, energy density can be improved.

In the following, effects of the improvement of energy density will be explained by referring to a case when an aqueous solution of sodium borohydride, a chemical reductant, is used, as an example of chemical reduction mechanism unit of a product reduction mechanism unit. The reduction reaction for reducing ketone, as a fuel oxidation product, is shown by the formula (6).

$$4R_2CO+NaBH_4 \rightarrow NaB(OCHR_2)_4$$

$$NaB(OCHR_2)_4+2NaOH+H_2O \rightarrow Na_3BO_3+4R_2-CHOH \quad (6)$$

As shown by the formula (6), 4 mol of ketone is reduced by 1 mol of sodium borohydride, as a reductant. By providing such product reduction mechanism unit, the alcohol oxidized by power generation is constantly regenerated by the reductant, and the fuel cell can continue the power generation until the reductant is used up. Also, when the reductant is used up, the reductant can be added, instead of newly adding an alcohol as a fuel.

Therefore, in this case, the energy density of fuel is determined by the reductant, instead of being determined by an alcohol which directly goes through the oxidation reaction. For example, in the case of sodium borohydride, the volume energy density calculated with the theoretical voltage (1.1 V) when proponol is used as a fuel and oxygen is used as an oxidant, is approximately 6900 Wh/L, drastically being improved compared with the case without the reductant (790 Wh/L).

A chemical reductant can be used as well for the product reduction mechanism unit. For the chemical reductant, metal hydride complex such as lithium borohydride, potassium borohydride, lithium aluminum hydride; metal hydride such as hydrogen storage alloy represented by $LaNi_5$; hydrogen gas; metals with reduction potential such as magnesium metal; a reductant represented by the general formula R—MgBr, typically represented by Grignard reagent wherein, R is a substituent selected from an alkyl group, an aliphatic group, an aromatic group, a hydroxyl group, an alkoxy group, an aldehyde group, and a carboxyl group. Alkyl group has an open-chain or a ring structure, and may include one or more oxygen atom, nitrogen atom, sulfur atom, silicon atom, phosphorous atom, boron atom, or halogen atom; for example, other than the above-mentioned sodium borohydride.

An example of product reduction mechanism unit using a chemical reductant is shown in detail in FIG. 3. The product reduction mechanism unit shown in FIG. 3 is an example of a fuel cell system having the product reduction mechanism unit of the present invention, and the present invention is not to be limited thereto.

The product reduction mechanism unit 35 in FIG. 3 comprises a reductant container 35a, a pump 35b, and a reducing reaction unit 35c. A mixture of unconsumed fuel and a fuel oxidation product produced at the electromotive unit of the fuel cell is introduced to the reducing reaction unit 35c via a fuel supply pipe 33a, in accordance with the direction of an arrow $P_1$. On the other hand, a reductant stored in the reductant container 35a is supplied to the reducing reaction unit 35c via pump 35b in accordance with the direction of an arrow $P_3$, and the fuel oxidation product is reduced in the reducing reaction unit 35c. The regenerated fuel is again sent to the electromotive unit via the fuel supply pipe 33b, in accordance with the direction of an arrow $P_2$.

In the reducing reaction unit 35c, the fuel oxidation product is made to have contact with the reductant. For example, the fuel oxidation product is usually liquid. When the reductant is gas, the reductant may be made to flow in (bubble) the fuel oxidation product.

In the reducing reaction unit 35c, a catalyst and the like may be added to easily advance the reduction reaction of the product by the reductant. Also, although the structure using the pump 35b for sending the reductant to the reaction unit as shown in FIG. 3 is especially effective when the reductant is in liquid state, or in a state where the reductant is dissolved in a liquid, this pump 35b does not have to be provided. When the pump 35b is not provided, the reductant container 35a and the reducing reaction unit 35c are made to become a single unit which commonly has both functions. This structure is especially effective when the reductant is in solid state, or in a state where the reductant is adsorbed on a solid matter. When the reductant is a gas, it is effective to place a pressure-reducing valve instead of the pump 35b.

Figure 4:
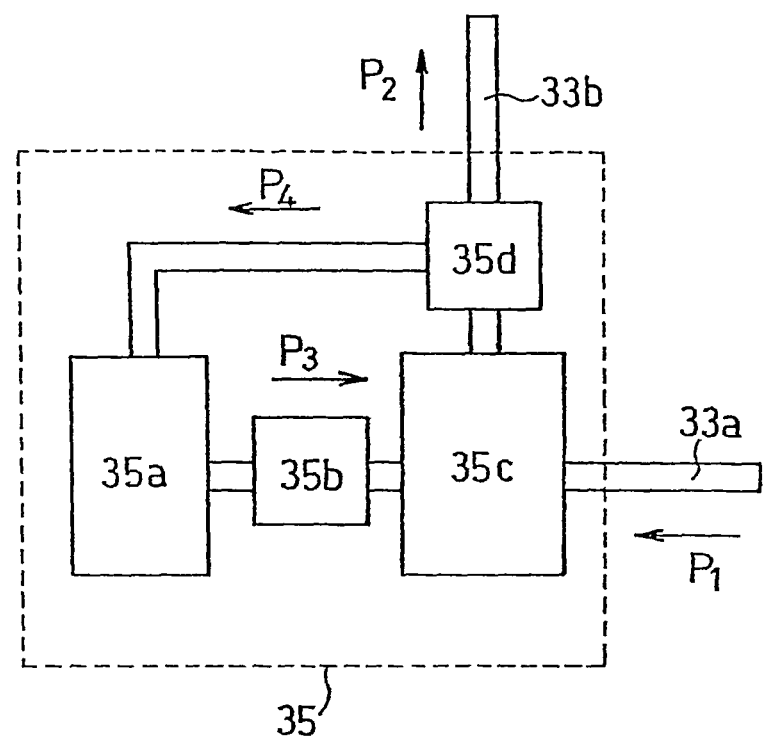
FIG. 4 is a sectional view schematically illustrating another product reduction mechanism unit of an embodiment of the present invention.

Also, when the reductant generates a reaction product after the reaction, it is effective to provide a separation unit 35d for separating the fuel solution and the reaction product after making reaction at the reaction unit 35c, as in FIG. 4. FIG. 4 shows a structure in which the separation unit 35d is provided in between the reaction unit 35c and the fuel supply pipe 33b in the structure of FIG. 3. In the reaction unit 35c, the fuel solution and the reductant are reacted. The reduced and regenerated fuel and the reaction product of the reductant are separated at the separation unit 35d. The fuel solution is sent to the fuel supply pipe 33b in accordance with the direction of an arrow $P_2$, and the reaction product of reductant is returned to the reductant container 35a in accordance with the direction of an arrow $P_4$. For the separation unit 35d, a separation by a filter and an adsorbent, or a separation by distillation can be used.

Additionally, in the fuel cell system including a product reduction mechanism unit using reductant, power generation is stopped when most of the reductant and the fuel in the fuel supply unit are consumed. In such case, in order for a further power generation to continue, a new reductant should be added to the fuel cell. As for the method to add reductant, the reductant may be charged directly into the reductant container. Or, considering practical convenience, it is desirable to change used reductant container with a reductant container charged with a new, unused reductant. Therefore, it is practically effective to provide the product reduction mechanism unit with a reductant container, a product reducing unit, and a fuel solution supply unit, and further, a reductant container attaching/detaching unit to attach and detach only the reductant container from the product reduction mechanism unit or the fuel cell system.

Figure 5:
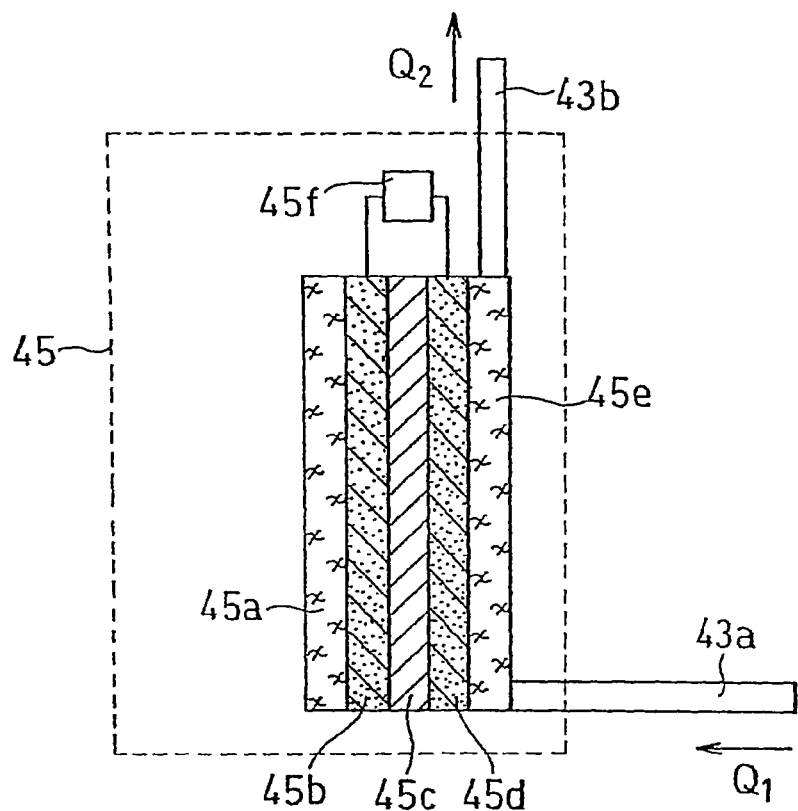
FIG. 5 is a sectional view schematically illustrating still another product reduction mechanism unit of an embodiment of the present invention.
Figure 6:
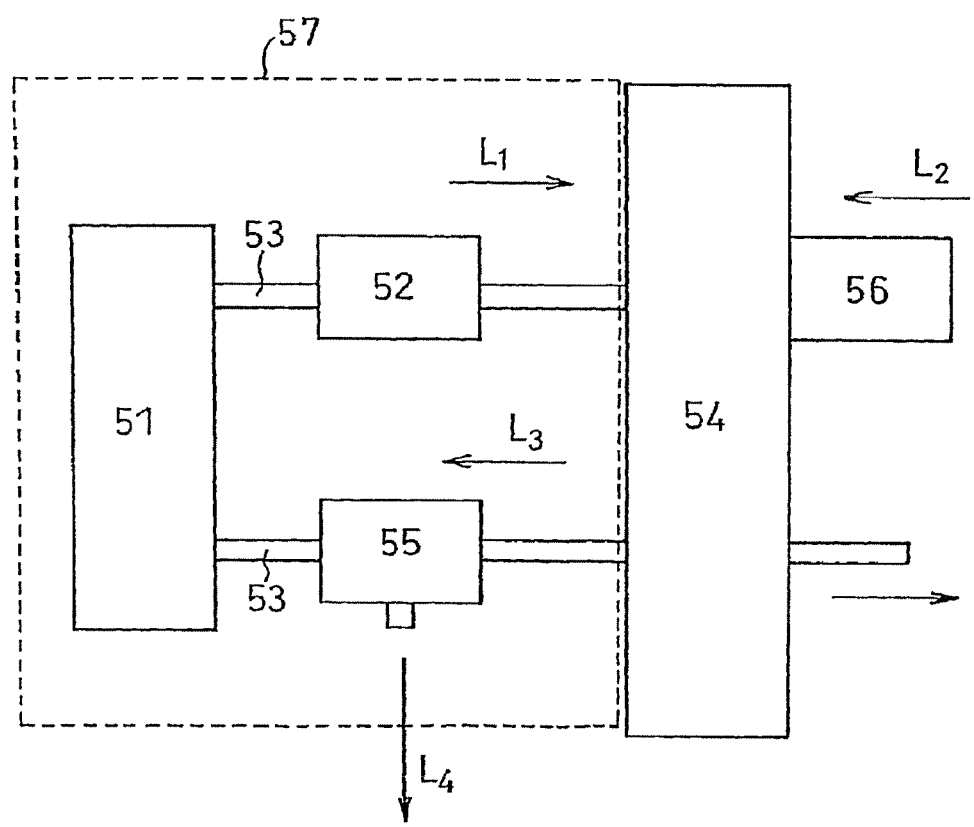
FIG. 6 is a sectional view schematically illustrating a fuel cell of prior art.

As for the method to reduce a product, other than the method by chemical reaction using chemical reductant as noted above, a mechanism for electrochemical reduction can be mentioned. In FIG. 5, an example of product reduction mechanism unit for electrochemical reduction of a product is shown in detail. The product reduction mechanism unit shown in FIG. 5 is an example of a fuel cell system including a product reduction mechanism unit of a present invention, and the present invention is not to be limited thereto.

The product reduction mechanism 45 in FIG. 5 comprises: a reducing electrode 45d being a first electrode for reducing a product electrochemically; a counter electrode 45b being a second electrode; an electrolyte membrane 45c sandwiched by the first electrode and the second electrode; a voltage applying mechanism unit 45f which can apply a voltage between the first electrode and the second electrode and can apply reduction potential to the first electrode; a diffusion layer 45e for diffusing the fuel including the fuel oxidation product; and a diffusion layer 45a for diffusing water or other solvent which can cause oxidation reaction at the counter electrode. A mixture of the fuel oxidation product and unconsumed fuel is supplied from the fuel supply pipe 43a to the diffusion layer 45e, and reduced to regenerate a fuel at the first electrode receiving the reduction potential, and the regenerated fuel is sent to the electromotive unit again via a discharge pipe 43b.

At this time, in the counter electrode 45b, which is the second electrode, an oxidation reaction is occurring: for example, when the solvent in the diffusion layer 45a is water, the water is oxidized to generate oxygen. Therefore, in this case, the generated oxygen has to be discharged to the outside of the fuel cell system, and consumed water has to be supplemented. Thus, when the solvent is water, energy is supplied from the outside power source, and fuel can be regenerated just by supplying water. Usually, a fuel cell can not be charged, and the fuel has to be continuously supplied. On the other hand, in the fuel cell system including a product reduction mechanism unit shown in FIG. 4, fuel can be regenerated with the use of outside power source, just by supplying a solvent such as water for example to the second electrode, enabling operation like a secondary battery. As for the outside power source, a direct current power source such as a primary battery and secondary battery, and an alternating current power source used in a generator, household power source, or the like may be used.

Further, as a product reduction mechanism unit, a photoreduction reaction can be utilized, in which photocatalysts such as titanium oxide, and zinc oxide are used and a light is applied to reduce a product.

As described in the above, the fuel cell system of the present invention includes a product reduction mechanism unit capable of reducing a fuel oxidation product, which is produced at the fuel electrode with generation of power. Based on this, an extremely safe fuel cell system with high energy density can be provided, by sealing a fuel system and not discharging toxic substance to the outside of the fuel cell for the first time.

Based on the fuel cell system of the present invention, a wide usage can be expected as a power source for electronic devices such as laptop computer and camcorder; a power source for vehicles such as automobiles, motorcycles, and electronically-powered bicycles; distributed power source such as household power generation system; as well as for an alternative high energy power source for devices which used primary and secondary batteries so far, for example.

In the following, the present invention is explained further in detail by referring to Example. However, the present invention is not to be limited thereto.

EXAMPLE

In this Example, a fuel cell system shown in FIG. 1 was fabricated.

Platinum particles with the mean particle size of approximately 30 Å were carried by Ketjen Black EC (AKZO Chemie BV, Netherlands), conductive carbon particles having the mean primary particle size of 30 nm, to obtain catalyst-carrying particles (50 wt % of platinum) of oxidant electrode side. Also, platinum particles and ruthenium particles with the mean particle size of approximately 30 Å were respectively carried by Ketjen Black EC, to obtain catalyst-carrying particles (25 wt % platinum, and 25 wt % ruthenium) of fuel electrode side.

Next, a catalyst paste of the oxidant electrode side and a catalyst paste of the fuel electrode side were made by mixing these catalyst-carrying particles respectively with a solution of hydrogen ion conductive polymer electrolyte. At this time, the weight mixing ratio of the catalyst-carrying particles and the hydrogen ion conductive polymer electrolyte was set to become 1:1. As for the hydrogen ion conductive polymer electrolyte, perfluorocarbon sulfonic acid (Flemion manufactured by Asahi Glass Co., Ltd.) was used.

Then, the catalyst paste of fuel electrode side was printed on one side of the hydrogen ion conductive polymer electrolyte membrane (Nafion 117 manufactured by E.I. du Pont de Nemours and Company, U.S.A.), and the catalyst paste of oxidant electrode side was printed on the other side thereof. Subsequently, the diffusion layer of the fuel electrode side and the diffusion layer of the oxidant electrode side were stacked to have the hydrogen ion conductive polymer electrolyte membrane in center, and joined together by hot pressing, to prepare an electrolyte membrane-electrode assembly (MEA). At this time, the area of the catalysts of fuel electrode and an air electrode was set to become 5 cm×5 cm. As for the diffusion layer of fuel electrode side and the diffusion layer of oxidant electrode side, a non-woven carbon fabric (membrane thickness 190 μm, porosity 78%) was used. The electromotive unit was thus obtained.

As for an aqueous solution of fuel, an aqueous solution of 2-propanol with the concentration of 1 mol/liter was used. The above aqueous solution of fuel was charged into the fuel electrode of the electromotive unit of the fuel cell 14, the fuel supply pipe 13a, the pump 12, and the fuel container 11 shown in FIG. 1. The amount of the aqueous solution of 2-propanol to be charged was set to become 50 cc.

As for the product reduction mechanism unit, the product reduction mechanism unit using the reductant shown in FIG. 4 was fabricated. Thus, the product reduction mechanism unit was formed from a reductant container, a pump, and a reducing reaction unit. As for the reductant to be charged in the reductant container, 50 g of an aqueous solution of sodium borohydride with a concentration of 30 wt % was used. Into the aqueous solution of sodium borohydride, a trace amount of sodium hydroxide was added to improve stability of the reductant solution while being stored. In this example, no catalyst was used in the reducing reaction unit.

Additionally, in order to prevent the reductant or a reaction product of the reductant from being mixed into the fuel solution, a separation unit was provided downstream from the reaction unit, to separate the reaction product of the reductant and the fuel solution. An evaporator was used for the separation unit, to separate liquid content and solid content (residue), and to return only the liquid content to the fuel supply pipe.

Air as an oxidant was supplied by the pump at the rate of 200 cc/min to the oxidant electrode of electromotive unit, and the aqueous solution of fuel was supplied by the pump at the rate of 10 cc/min to the fuel electrode of electromotive unit. Supplying rate of the reductant in the product reducing unit was set to become 0.5 cc/min.

Without controlling the temperature of the fuel cell, a power generation test was conducted under a room ambience with a constant current of 2.5 A, and stable voltages of approximately around 0.4V were shown. Although a stable power generation could be continued for 130 minutes from the start of the power generation, the voltage gradually dropped approximately after the elapse of 130 minutes, achieving about 135 minutes of power generation in the end. This means that a power generation of a long duration of time, approximately 1.7 times of the conventional example shown in Comparative Example 1, was enabled.

The concentration of 2-propanol was checked with a gas chromatography, by taking out 1 cc of the fuel solution with a syringe from the fuel supply pipe 13c, where the aqueous solution of fuel after generating power passed through the product reduction mechanism unit flowed in, at after 50 minutes and 100 minutes from the start of the power generation. It was found that the concentration was respectively 0.96 mol/liter and 0.94 mol/liter. This confirmed that a product was being reduced by the product reduction mechanism unit.

Additionally, after the stop of power generation as well, 1 cc of the aqueous solution of fuel was taken out from the fuel supply pipe 13c, where the fuel solution passed though the product reduction mechanism unit flowed in, to check the concentration by a gas chromatography in the same manner, and it was found that the concentration was 0.43 mol/liter. Based on this, it can be estimated that the concentration of the fuel was reduced due to the reductant in the product reduction mechanism unit being used up and the power generation stopped.

No leakage from the fuel cell system was found, of course. For sure, only the oxidant electrode of fuel cell was made to become open, where air can freely go in and out. And the fuel electrode, the fuel supply unit, the fuel container, the pump, and the product reducing unit were all put in a bag made of Teflon to be sealed and then the fuel cell system was operated. After the operation, the air in the Teflon bag was analyzed by a gas chromatography. In this case, 2-propanol and other organic matters derived from the fuel were not detected. Therefore, it was confirmed that there was no leakage of fuel, product and fuel oxidation by-product to the outside of the fuel cell system, not to mention that there was no leakage from the fuel cell system.

Therefore, based on the fuel cell of the present invention, including a product reduction mechanism, which can reduce a fuel oxidation product produced at fuel electrode with generation of power, an extremely safe fuel cell with a high energy density can be provided, by sealing a fuel system to not discharge toxic substance to the outside of the cell.

Additionally, the power generation test was conducted in the same manner as the above except for the following points. That is, the chemical reductant used for reduction of product was changed to other metal hydride complex such as potassium borohydride or lithium borohydride from the sodium borohydride, to conduct the power generation test. All of these reductants were used as an aqueous solution having a concentration of 30 wt %, and the aqueous solution was used at an amount of 50 g. Results are shown in Table 1. As shown in Table 1, in any of the cases, a longer power generation was possible than the case without using reductant. Among these three reductants, the case using lithium borohydride with the smallest molecular weight achieved the power generation of the longest time.

TABLE 1

| Sample Condition | | | Test Results |
|---|---|---|---|
| Sample | Reductant | Usage Amount (g) | Duration of Operation(min) |
| 1 | Sodium borohydride | 50 | 135 |
| 2 | Potassium borohydride | 50 | 108 |
| 3 | Lithium borohydride | 50 | 210 |
| Comp. Ex. 1 | Not Used | — | 83 |

Although 2-propanol was used as a fuel in Example 1, other than 2-propanol, in the cases of ethanol, butanol, ethylene glycol, diethyl ether as well, a longer power generation was respectively possible by having the product reduction mechanism including a reductant, compared with the case with no reductant.

COMPARATIVE EXAMPLE

As a comparative example, a fuel cell system with the exact same structure with Example 1 except for the following points was prepared. That is, the reductant was not put inside the reductant container of product reduction mechanism unit shown in FIG. 4. Instead, a fuel in the same weight with the reductant used in Example 1, that is, 50 g of an aqueous solution of 2-propanol was charged in the reductant container.

Since a reductant is not used in this comparative example, separation unit is not necessary. However, for comparison, an evaporator was used as in Example.

For the oxidant electrode of electromotive unit, air as an oxidant was applied at the rate of 200 cc/min by a pump, and for the fuel electrode of electromotive unit, an aqueous solution of fuel was supplied by a pump at the rate of 10 cc/min. To the fuel supply unit, 2-propanol charged in the reductant container was supplied in the rate of 1.2 cc/min.

Without controlling the temperature of the cell, when a power generation test was conducted under a room ambience with a constant current of 2.5 A, stable voltages of approximately around 0.4V were shown, as in Example 1. Although a stable power generation could be continued for 75 minutes from the start of the power generation, the voltage gradually dropped approximately after the elapse of 75 minutes, achieving only about 83 minutes of power generation in the end. As shown in "Comparative Example" column in Table 1, the period of the power generation was shorter than the case where the product reduction mechanism is provided in Example 1.

The concentration of 2-propanol was checked with a gas chromatography, by taking out 1 cc of the fuel solution with a syringe from the fuel supply pipe 13c, where the aqueous solution of fuel after generating power passed through the product reduction mechanism flowed in, after 50 minutes from the start of the power generation and after the power generation was stopped. It was found that the concentration was respectively 1.02 mol/liter and 0.38 mol/liter. It can be guessed that the fuel concentration was reduced because the reductant in the product reduction mechanism was used up and the power generation was stopped.

INDUSTRIAL APPLICABILITY

According to the present invention, an extremely safe, longer operation period, and higher energy density fuel cell can be provided for the first time, by closing a fuel system to achieve absolutely no leakage of fuel, fuel oxidation by-products, and the like to the outside of the cell.

The invention claimed is:

1. A fuel cell system having:
   a fuel cell including an electromotive unit comprising a fuel electrode, an oxidant electrode, and an electrolyte sandwiched by said fuel electrode and said oxidant electrode;
   a fuel supply unit for supplying a fuel to said fuel electrode; and
   an oxidant supply unit for supplying an oxidant to said oxidant electrode;
   wherein said fuel is an organic fuel which produces proton by electrochemical oxidation reaction,
   said fuel supply unit includes:
   a fuel container;
   a product reduction mechanism unit for reducing a fuel oxidation product produced at said fuel electrode by power generation of said fuel cell to regenerate a fuel, said fuel oxidation product including at least one of a ketone and a carboxylic acid;
   a first fuel supply pipe connecting said fuel container and said electromotive unit of said fuel cell;
   a discharge pipe connecting said fuel cell and said product reduction mechanism unit; and
   a second fuel supply pipe connecting said product reduction mechanism unit and said fuel container;
   said fuel is sent from said fuel container to said electromotive unit through said first fuel supply pipe,
   said fuel oxidation product is sent to said product reduction mechanism unit from said fuel electrode through said discharge pipe,
   said regenerated fuel is sent to said fuel container from said product reduction mechanism unit through said second fuel supply pipe, said regenerated fuel being an organic fuel which produces proton by electrochemical oxidation reaction,
   said product reduction mechanism unit includes a reductant for chemically reducing said fuel oxidation product, and
   said reductant is metal hydride complex compound, metal hydride, metal, or a compound represented by the general formula R—MgBr,
   wherein in the formula, R is an alkyl group, an aliphatic group, an aromatic group, a hydroxyl group, an alkoxy group, an aldehyde group, or a carboxyl group, and said alkyl group has an open-chain or a ring structure and may include one or more oxygen atom, nitrogen atom, sulfur atom, silicon atom, phosphorous atom, boron atom, or halogen atom.

2. The fuel cell system in accordance with claim 1, wherein said product reduction mechanism unit includes a reductant container, a reducing reaction unit, and a pump for sending said reductant from said reductant container to said reducing reaction unit.

3. The fuel cell system in accordance with claim 1, wherein said organic fuel is an alcohol which produces at least one of a ketone and a carboxylic acid by an oxidation reaction.

4. The fuel cell system in accordance with claim 1, wherein said organic fuel is ethanol, propanol, butanol, ethylene glycol, diethyl ether, or cyclohexane, or a mixture thereof.

5. The fuel cell system in accordance with claim 3, wherein said alcohol has a carbon number of two or more.

6. The fuel cell system in accordance with claim 1, wherein said fuel releases protons by an electrochemical oxidation reaction and is not oxidized to become carbon dioxide by complete combustion due to the electrochemical oxidation reaction.

7. The fuel cell system in accordance with claim 1, wherein:
   said first fuel supply pipe is further provided with a pump, and
   said pump sends said fuel from said fuel container to said electromotive unit through said first fuel supply pipe.

8. The fuel cell system in accordance with claim 1, wherein said reductant is the metal hydride complex compound.

9. The fuel cell system in accordance with claim 8, wherein the metal hydride complex compound comprises lithium borohydride.

* * * * *